United States Patent Office 2,708,626
Patented May 17, 1955

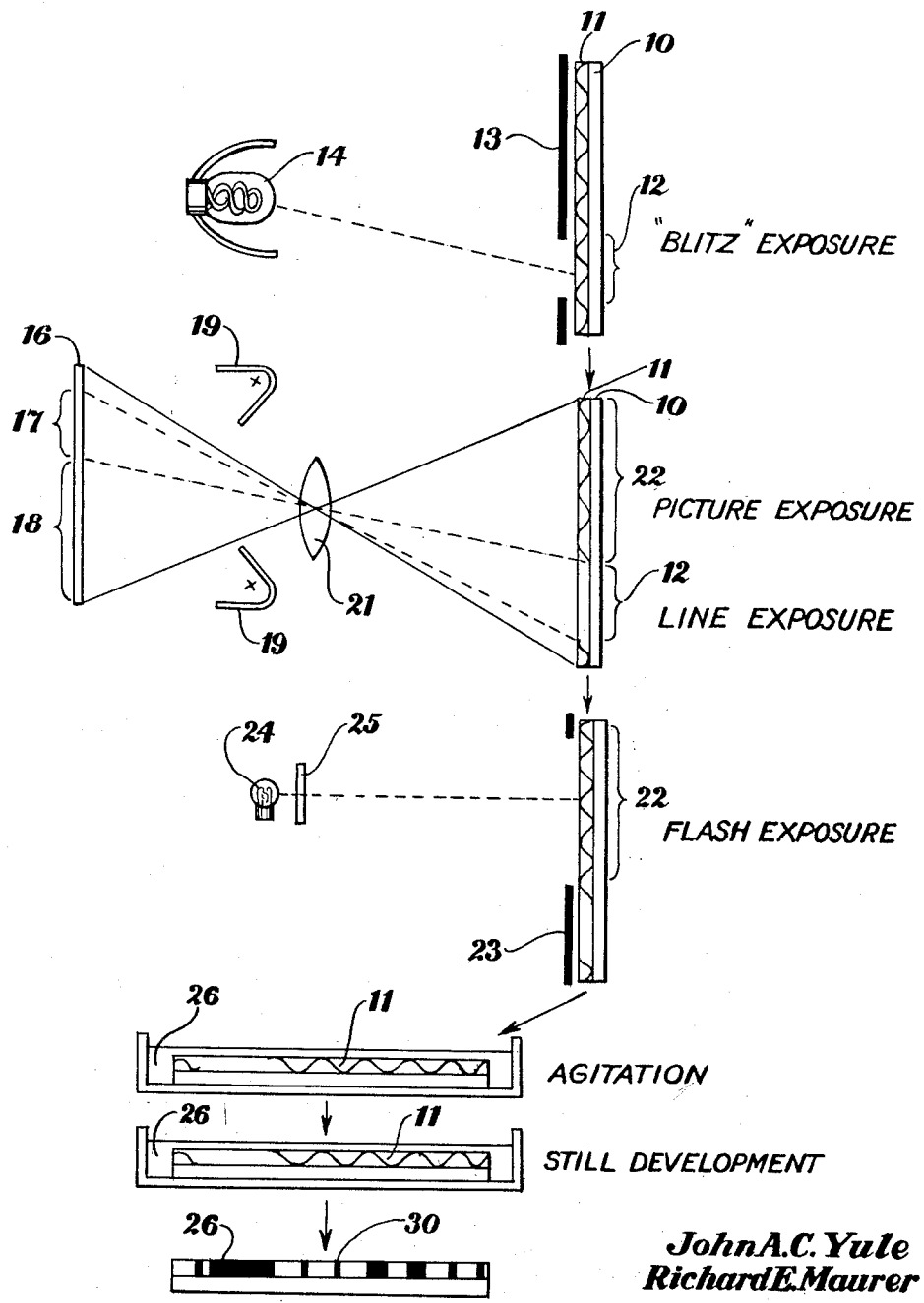

2,708,626

PHOTOGRAPHIC PROCESSES USING PRESCREENED MATERIAL

John A. C. Yule and Richard E. Maurer, Rochester, N. Y., assignors to Eastman Kodak Company, Rochester, N. Y., a corporation of New Jersey Application June 4, 1952, Serial No. 291,621

3 Claims. (Cl. 95—5)

This is a continuation-in-part of application, Serial No. 168,718, filed June 17, 1950, now abandoned, having to do with prescreened photosensitive material made by Clayden densitization or by the combination of densitization. Reference is also made to two other continuations-in-part thereof, Serial Nos. 291,622, and 291,623, filed concurrently with the present case, now issued as U. S. Patents 2,691,585 and 2,691,586.

The present invention relates to processes using such materials for the making of halftone images and for the making of line images without the halftone effect.

Prescreened material produces a halftone image upon exposure to a continuous tone picture. One object of the present invention is to reproduce line copy, i. e., lettering or line drawings on prescreened material.

A second object of the invention is to reproduce both line and picture copy with the picture copy reproduced in halftone.

A third object of the invention is to extend the effective reproducible range or effective scale of the prescreened material in order to accommodate long scale subjects. The effective scale of the prescreened material in terms of the density of the original subject is the difference in density between the point of the subject which produces a suitable dot to record the highlights and one which produces a suitable dot to record the shadows in the halftone material. This effective scale is a property of the prescreened material. It may be extended by flash exposure or still development as discussed below. The primary purpose of extending the scale is to accommodate a subject whose density range exceeds that of the unextended effective scale of the material alone. However, it is also useful in holding down the contrast of the reproduction process in those special cases wherein the original subject has a very short density range and the operator wishes to reproduce this short density range exactly. Many printing processes have an overall gamma greater than one so that a pencil sketch, for example, is normally reproduced more contrasty than is proper if the finished result is to look like a pencil sketch. It is in these special cases that the flash exposure and/or still development are used to extend the scale of the prescreened material beyond that of the subject itself. In general, according to the invention, the effective scale is extended until it is at least substantially as great as the density scale of the picture being copied.

To accomplish all of the above objects, the present invention employs a number of discoveries concerning the effect of high and low intensity exposures, the effect of short and long duration exposures, the effect of successive exposures, the effect of controlled agitation during development, and particularly the effect of these factors on the scale or contrast range being reproduced. For clarity, these various factors are now discussed and defined separately.

Clayden desenitization as used in making the prescreened material requires a short duration exposure. For example, one may employ a vapor flash lamp high intensity exposure through a ruled screen to provide Clayden desensitization in the corners of the dots of the halftone pattern. The duration of such flash lamp exposures is exceedingly short. There is a cutoff point or region above which the exposure is no longer effective in giving Clayden desensitization. This cutoff point differs with different materials and may be on the order of $\frac{1}{200}$, $\frac{1}{25}$, or in some unusual cases, as long as one second exposure. The intensity selected is that which gives substantially maximum densitization at the dot corners. As one proceeds from the corner of the dot toward the center, the desensitization is progressively less, and at areas adjacent to the center there is substantially no desensitization. In some forms of Clayden prescreened material the centers of the dots are provided with hypersensitization by a relatively low intensity long exposure, but the present invention is not particularly concerned with the presence or absence of hypersensitization in the dot centers. There are some areas adjacent to the dot centers, whether this includes the exact center or not, which have substantially no desensitization and which can be further desensitized.

The hypersensitizing exposure may have been merely of sufficient intensity to provide maximum hypersensitization without any actual latent image being formed, i. e., the exposure may be just less than threshold, or the centers of the dots may include an actual tiny latent image.

The next type of exposure to be discussed is herein referred to as a "blitz" exposure. This exposure actually serves to eliminate the prescreening and to restore the film to its original, non-prescreened condition although the effective speed of the film may be slightly different and there may be a residual pattern, for example, of hypersensitization, which is more or less harmless. The blitz exposure is generally of the same order of duration and intensity as the Clayden desensitizing exposure, but it is not through a halftone screen. In those areas of the prescreened material which receive the blitz exposure, the corners of the dots, which have previously received maximum desensitization, become more sensitive again due to the added exposure. On the other hand, the areas adjacent to the centers of the dots which have received little or no Clayden desensitization through the original screen, are now Clayden desensitized slightly. It turns out in practice that the film becomes substantially uniform in sensitivity throughout the whole blitzed area. That is, the sensitivity is "flattened" out by a high intensity short exposure, which explains in two ways why the term "blitz" has been adopted for this particular exposure.

Optimum Clayden densitization does not make the sensitive layer completely insensitive. It reduces the sensitivity thereof by a factor which, in log E units, corresponds to the effective scale of the material as discussed below. Additional Clayden exposure by the above-mentioned blitz carries the effect beyond its optimum and hence increases the reduced sensitivity of the corners very slightly. At the centers and in the intermediate areas, the blitz exposure reduces the sensitivity.

The ordinary image exposure when using the regular prescreened material, is normally of long duration and must not be too short or there will be some flattening of the sensitivity pattern which will result in inferior reproduction. That is, the image exposure must exceed the cutoff point (e. g., $\frac{1}{25}$ second) of the material being used. The exposure must be of sufficient intensity and sufficiently long duration to expose the lightest areas of the copy fully without desensitizing any areas of the sheet. This brings up a rather curious effect which, in a sense, is alternative to a main feature of the invention to be discussed below in connection with the reproduction of line copy. In accordance with this alternative effect, line work may be reproduced directly on prescreened material merely by making the exposure to the line work a high intensity short duration exposure, but in this case the intensity has to be extremely high, e. g., by contact printing. Hence, this alternative method is not as satisfactory as the blitz method discussed below.

Still another type of exposure used in certain embodiments of the present invention is the flash exposure used for extending the range of the prescreened film in order to reproduce long scale subjects. This flash exposure has the same order of intensity and duration as the image exposure. It must not be a short duration high intensity exposure such as the blitz exposure. The effect of the flash exposure is such that this exposure may be either before or after the picture exposure on ordinary prescreened film. The blitz exposure on the other hand is not used with pictures but only with line work and must always be prior to the exposure of the line work.

The scale or density range of the material is further extended in certain embodiments of the invention by still development, i. e., by developing with no agitation or with agitation only for a short interval followed by still development for the remainder of the development period. The flash exposure and still development factors for extending the effective scale of the prescreened material are similar in many respects to the same steps when used in ordinary halftone processes employing ordinary film and ruled screens or contact screens. These ordinary processes sometimes also employ an image exposure without the screen to shorten the scale in the highlights, but in the present process the screen cannot be removed except when blitz effects are used and so this type of scale shortening is not directly and easily applicable to the present invention. One important distinguishing feature between screen processes and prescreened material processes, as far as extension of scale is concerned, is the fact that with prescreened materials the duration or time of exposure becomes somewhat critical since extremely short exposures affect the prescreening adversely as far as image and scale extension are concerned. Also, the scale which is to be extended depends on the distribution of sensitivities rather than on a distribution of brightnesses as is the case with contact and ruled screens. It turns out that the relationships follow similar mathematical laws, however.

According to the invention, one starts with Clayden prescreened photographic sheet material such as film or plate with the dot corners Clayden desensitized and with areas adjacent to the dot centers having substantially no desensitization. This material is used for reproducing line work by first exposing the sheet or selected area thereof uniformly to a high intensity short duration exposure of sufficient intensity and sufficiently short duration to Clayden desensitize the areas adjacent to the dot centers and on the other hand to reduce the desensitization of the dot corners. This provides substantially the same sensitivity in the areas adjacent to the centers and in the corners. The sheet is then exposed to the line work which is to be reproduced and processed to form a line negative of the line work.

In a preferred embodiment of the invention, both line and picture copies are reproduced on Clayden prescreened material of the above-discussed type by masking off the areas which are to receive the picture and giving the blitz exposure to the remainder areas. The remainder areas are then exposed to the line copy and the picture areas are exposed to the picture copy either separately or at the same time. The exposure of the picture copy is the more critical one and should be of sufficiently long duration to avoid Clayden desensitization. In general it should exceed $1/25$ second. The film or sheet is then processed to form a line and halftone picture negative of the line and picture copy. Preferably, the picture areas of the sheet are also given a uniform flash exposure either before or after exposure to the picture image, the flash exposure being of sufficient intensity and sufficiently long duration to extend the effective scale of the sheet. This flash exposure may also be given to the line copy areas, if given subsequent to the blitz exposure. Preferably, also, the sheet is developed at least partly by still development to extend the effective scale still further. Specifically, if the effective scale of the sheet unextended is A, the extension of the scale due to the flash exposure is B, and the extension of the scale to the still development is C, A+B+C is made at least substantially as great as the density scale of the picture copy. In general it is made substantially equal to this density scale in order to reproduce the copy fully. However, in those special cases mentioned previously, it is sometimes made to exceed this scale so as to reproduce a low scale subject accurately with a high gamma printing system.

Although the use of flash exposures and still development with prescreened material differs from its use with contact screens, the effect on scale obeys the same mathematical laws which are described in detail in:

"Tone reproduction in halftone negatives" by J. A. C. Yule, Proceedings of Annual Technical Meeting, Technical Association of the Lithographic Industry, 1950, page 67.

"Improved halftones with Kodak magenta contact screens." Eastman Kodak Company, October 1950.

"Instructions for making halftone negatives." Eastman Kodak Company, February 1951.

When exposing prescreened material by contact printing, it has been found preferable to use a thin transparent spacer so that the grain of the image does not interfere with the structure of the individual dots.

The invention will be fully understood from the following description of a preferred embodiment of the invention when read in connection with the accompanying drawing which shows:

A flow chart schematically illustrating all of the preferred features of the invention.

In the drawing a prescreened film consisting of a support 10 and a silver halide emulsion layer 11 which has been Clayden desensitized through a halftone screen to have an undulating sensitivity halftone pattern, is masked by an opaque mask 13 so that only area 12 of the prescreened film is exposed. The exposure of area 12 is a blitz exposure by a high intensity vapor flash lamp 14. This blitz exposure effectively removes the prescreening from the area 12 although there may be a slight residual dot pattern, especially if the prescreening was partly by hypersensitization, but even so, this dot pattern is practically harmless in the area 12 which is to be used for reproduction of line work.

In the second step of the drawing the prescreened and partly blitzed film is exposed through a lens 21 to copy 16 whose area 17 includes only lettering and whose area 18 includes a picture which is to be reproduced by halftone. The copy is illuminated by arc lamps 19. The lettering in area 17 is focused on the blitzed area 12 of the prescreened film 11. The picture area is exposed onto the regular prescreened area 22 of the film.

In the third step of the process, the effective scale of the prescreened material in the halftone area 22 is extended by a flash exposure. The remaining areas including the blitzed area 12 are masked off by a mask 23. As stated above, it is not absolutely necessary to mask off the blitzed area but it is preferable to do so. The flash exposure is provided by a low intensity lamp 24, about $7\frac{1}{2}$ watts through a yellow Series 00 Safelight filter 25 at a distance of 6 to 8 feet, the exposure being on the order of 12 seconds with prescreened materials of the lith type such as discussed in our two applications mentioned above. The film is then placed in a lith or surface type developer 26 (such as the type described in U. S. Patent 2,313,523, Donovan et al.) and is processed first with agitation for about one minute and then with still development for the remainder of the development period which totals about 2¼ minutes with standard lith developers. The period of agitation is in general standardized and may, for example, be 45 seconds, 1 minute, 1¼ minutes, or 1½ minutes. The standardized still development provides a standard amount of scale extension and the flash exposure is then selected to give whatever additional scale extension is desired. Flash exposures have been used in halftone work for many years and the methods of using them are well known. For extremely critical work one may follow the method of determining the precise flash exposure as set forth in "Tone Reproduction in Halftone Negatives" by J. A. C. Yule, mentioned above.

In general it is preferable not to extend the overall development time when employing still development since excessive development has a tendency to destroy the halftone effect all of which ties in with the fact that full realization of Clayden desensitization depends on the fact that surface developers are used, preferably developers of the surface type which give infectious development.

On the other hand, slightly prolonged development may be used to shorten exposure range and increase highlight contrast in cases where the accompanying adverse effects are acceptable. As mentioned previously, this flash exposure and still development may be used either for matching the scale of the material to that of the subject or for reducing the scale of a low scale subject so that it is reproduced accurately by a high gamma printing process.

The final step of the flow chart shows the dots 30 of a halftone image and sections 31 of a line or letter image.

We claim:

1. The method of reproducing line work with a Clayden prescreened photographic sheet with dot corners Clayden desensitized and areas adjacent to the dot centers with substantially no desensitization, which comprises exposing the sheet uniformly to a high intensity short duration exposure of substantially the same order of duration and intensity as that used in prescreening the film whereby said adjacent areas are Clayden desensitized and the desensitization of said corners is reduced to provide substantially the same sensitivity in said areas and said corners, then exposing the sheet to said line work and developing the sheet.

2. The method of reproducing both line and picture copy with a Clayden prescreened photographic sheet with dot corners Clayden desensitized and areas adjacent to the dot centers with substantially no desensitization, which comprises covering with opaque material the areas of the sheet which are to receive picture, exposing the remainder areas of the sheet uniformly to a high intensity short duration exposure of substantially the same order of duration and intensity as that used in prescreening the film whereby said adjacent areas are Clayden desensitized and the desensitization of said corners is reduced to provide substantially the same sensitivity in said areas and said corners, then exposing said remainder areas to said line copy and the picture areas to said picture copy and developing the sheet, the duration of the exposure to said picture copy exceeding $\frac{1}{25}$ second.

3. The method according to claim 2 in which the picture areas are also given a uniform flash exposure of sufficient intensity and sufficiently long duration to extend the effective scale of the sheet and in which said developing is at least partly still developing to extend further the effective scale of the sheet.

References Cited in the file of this patent

Eastman Kodak Co., "Improved Halftones with Kodak Magenta Contact Screens," 1950, 6 pp.